Patented May 23, 1933

1,910,819

UNITED STATES PATENT OFFICE

HERBERT J. WEST, OF CRAFTON, PENNSYLVANIA, ASSIGNOR TO THE SELDEN COMPANY, OF PITTSBURGH, PENNSYLVANIA, A CORPORATION OF DELAWARE

PURIFICATION OF VAT DYES AND INTERMEDIATES

No Drawing.    Application filed January 22, 1931.    Serial No. 510,512.

This invention relates to the purification of vat dyes of the nitrated perylene type.

The most extensively sold nitrated perylene dye is nitrated dibenzanthrone or as its reduced vat is known in the trade, indanthrene green-B. In the past the shade of this dye has been considerably dulled due to the fact that the dibenzanthrone from which it is prepared by nitration and subsequently reduction is made from benzanthrone by caustic fusion and only about one-half of the crude material is vatable dye, the remaining non-vatable impurities adversely affecting the shade. It has hitherto been proposed to remove these non-vatable impurities before nitration by a filtration process applied to the leuco compound. This process produces a dye substantially free from non-vatable impurities but which contains vatable impurities, but the filtration of the impurities presents serious difficulties so that the cost of the process is relatively high although in the past it has been used despite its high cost because of the brighter shades which can be obtained.

The present process is based on the surprising discovery that although the dye obtained by nitrating purified dibenzanthrone free from non-vatable impurities does not contain any impurities which are not vatable, that is to say insoluble in hydrosulfite, it does contain vatable impurities, and by treatment with a mild alkaline oxidizing agent such as a hypochlorite, hypobromite, etc. the vatable impurities are destroyed or transformed so that brighter shades of dyeing are obtained. The process also destroys colloidal material so that the dyestuff may be handled more easily.

The oxidizing treatment of the present inventon is generally applicable to nitrated perylene dyestuffs with the exception of certain nitrated perylene imides and their N-alkyl or aryl derivatives. These dyes appear to be attacked by alkaline oxidizing agents such as hypochlorites and the process is therefore not applicable to them. Otherwise it is generally applicable to nitrated perylene dyestuffs, for example the blue dye which is obtainable by nitrating isoviolanthrone and similar nitrated perylene dyestuffs irrespective of whether the dye is a ketonic dye or not.

The invention will be described in greater detail in connection with the following specific examples.

Example 1

100 kilograms of nitrated violanthrone which has been freed from non-vatable impurities by treatment with hydrosulphite are thoroughly ground in the cold with 500 liters of a 10% sodium hypochlorite solution. The mixture is heated gradually until it boils and is kept boiling for about 10 to 15 minutes. Thereafter the mixture is filtered and the solid material dried. The yield is over 90% of the purified dyestuff.

Cotton or regenerated cellulose material dyed with the dye obtained by reducing the purified nitrated violanthrone shows a much brighter shade and a noticeably stronger dyeing than when the material is dyed with a nitroviolanthrone which has not been subjected to purification by the mild oxidizing agent. The improvement in shade and brightness is particularly apparent when the green amino violanthrone is transformed into the black dye of commerce by means of hypochlorites. The shade is substantially entirely free from the objectionable brown tone of the black which has caused considerable difficulties in the past.

Example 2

The blue dyestuff prepared by nitrating isoviolanthrone which has been purified by hyposulphite is treated with hypochlorite or hypobromite as described in Example 1. The yield of purified dyestuff is 90% or better. Cotton or regenerated cellulose material dyed with the reduced purified blue dyestuff shows a remarkable increase in brightness of shade and a noticeable increase in strength of color when compared with material dyed with the blue dyestuff which has not been subjected to the purification with oxidizing agents. After treatment with hypochlorite to transform the reduced blue dye into the black dye a similar difference in brightness of shade and strength of dyeing is observed.

Instead of using hypohalites in the preformed state as described above they may be formed in the nascent state with alkali and halogen and in cases this is a very efficient method. Other mild alkaline oxidizing agents having an oxidizing power comparable to the hypohalites may be used and are effective, though I find that the hypohalites and particularly the hypochlorites, either preformed or in the nascent state, are the most satisfactory for practical commercial use.

What is claimed as new is:

1. A method of purifying a nitrated dibenzanthrone compound which is substantially free from non-vatable impurities but which contains vatable impurities, which comprises subjecting it to the action of a mild alkaline oxidizing agent.

2. A method according to claim 1, in which the oxidizing agent is a hypochlorite.

3. A method of purifying nitrated violanthrone substantially free from non-vatable impurities but containing vatable impurities, which comprises subjecting the nitroviolanthrone to the action of a mild alkaline oxidizing agent.

4. A method according to claim 3, in which the oxidizing agent is a hypochlorite.

5. A method of purifying nitrated violanthrone substantially free from non-vatable impurities but containing vatable impurities, which comprises treating it in aqueous suspension with a hypohalite and filtering.

6. A method according to claim 5, in which the reaction takes place at about the boiling point of water.

7. A method of preparing a purified nitrated violanthrone, which comprises subjecting a crude violanthrone to the action of alkaline hyposulphite solution, filtering to remove non-vatable impurities, transforming the soluble leuco compound into the dye, subjecting the purified dye to nitration, and then subjecting the nitrated dye to the action of a mild alkaline oxidizing agent.

8. A method according to claim 7, in which the mild oxidizing agent is a hypochlorite.

9. A method according to claim 7, in which the mild oxidizing agent is a hypochlorite and the reaction takes place in aqueous suspension at about the boiling point of water.

10. As a new chemical product, a vat dye prepared from a nitrated perylene compound insensitive to hypohalites, substantially free from non-vatable impurities but containing vatable impurities, which has been purified by a mild oxidizing agent.

11. As a new chemical product, a vat dye prepared from a nitrated perylene compound insensitive to hypohalites, substantially free from non-vatable impurities but containing vatable impurities, which has been purified by a hypochlorite.

12. As a new chemical compound, a vat dye prepared from a nitrated violanthrone which is substantially free from non-vatable impurities but contains vatable impurities and which compound has been purified by a mild alkaline oxidizing agent such as a hypochlorite.

13. As a new chemical compound, a black dye prepared from nitrated violanthrone which contained vatable impurities but substantially free from non-vatable impurities and which has been subjected to purification by the action of a mild alkaline oxidizing agent such as a hypochlorite, followed by reduction to the amino compound and treatment with an oxidizing agent to form the black dyestuff.

Signed at Pittsburgh, Pennsylvania, this 21st day of January, 1931.

HERBERT J. WEST.